US010118081B2

United States Patent
Huebsch

(10) Patent No.: US 10,118,081 B2
(45) Date of Patent: Nov. 6, 2018

(54) SYSTEM FOR PROVIDING GAME-RELATED INFORMATION

(71) Applicant: Michael Hunter Huebsch, Darien, CT (US)

(72) Inventor: Michael Hunter Huebsch, Darien, CT (US)

( * ) Notice: Subject to any disclaimer, the term of this patent is extended or adjusted under 35 U.S.C. 154(b) by 0 days.

(21) Appl. No.: 15/004,000

(22) Filed: Jan. 22, 2016

(65) Prior Publication Data

US 2016/0213995 A1 Jul. 28, 2016

Related U.S. Application Data

(60) Provisional application No. 62/107,019, filed on Jan. 23, 2015.

(51) Int. Cl.
| | |
|---|---|
| *A63B 69/00* | (2006.01) |
| *A63B 71/06* | (2006.01) |
| *G07C 1/24* | (2006.01) |
| *G06F 17/30* | (2006.01) |
| *H04M 1/725* | (2006.01) |

(52) U.S. Cl.
CPC ........ *A63B 71/06* (2013.01); *G06F 17/30312* (2013.01); *G06F 17/30345* (2013.01); *H04M 1/72522* (2013.01)

(58) Field of Classification Search
CPC combination set(s) only.
See application file for complete search history.

(56) References Cited

U.S. PATENT DOCUMENTS

| | | | |
|---|---|---|---|
| 6,725,107 B2 * | 4/2004 | MacPherson | A63B 71/0669 273/459 |
| 6,984,176 B2 * | 1/2006 | Bishop | A63B 71/06 463/40 |
| 8,731,458 B2 * | 5/2014 | Sullivan | H04N 21/2187 455/3.03 |
| 9,330,726 B1 * | 5/2016 | Lawson | H04N 21/4788 |
| 9,451,334 B1 * | 9/2016 | Lawson | H04N 21/4788 |
| 9,454,993 B1 * | 9/2016 | Lawson | G11B 27/102 |
| 2002/0138163 A1 * | 9/2002 | MacPherson | A63B 71/0669 700/92 |

(Continued)

*Primary Examiner* — Travis Hunnings
(74) *Attorney, Agent, or Firm* — Fitzpatrick, Cella, Harper & Scinto

(57) ABSTRACT

An electronic apparatus for providing game-related information includes a computer processor, a memory device, a display screen, a transmitter, and a communication interface. The memory device stores at least one piece of computer code executable by the computer processor and data used by the computer code. The transmitter enables information to be communicated to a scoreboard. The communication interface enables information to be communicated to subscribers identified on a subscriber list stored in a database of the memory device. The computer code includes code for providing a user interface on the display screen to enable a scorekeeper to input an information item relating to a game, controlling the transmitter to transmit the information item to the scoreboard, controlling the memory device to store the information item in a memory therein, and controlling the communication interface to transmit the information item to at least one subscriber identified on the subscriber list.

62 Claims, 12 Drawing Sheets

(56) References Cited

U.S. PATENT DOCUMENTS

| | | | | |
|---|---|---|---|---|
| 2003/0045357 A1* | 3/2003 | Bishop | ............... | A63B 71/06 |
| | | | | 463/42 |
| 2014/0288683 A1* | 9/2014 | Sullivan | ........... | H04N 21/2187 |
| | | | | 700/92 |
| 2015/0251075 A1* | 9/2015 | Ianni | ............... | G06K 9/00342 |
| | | | | 700/91 |
| 2015/0258416 A1* | 9/2015 | Ianni | ............... | G06K 9/00342 |
| | | | | 700/91 |

\* cited by examiner

FIG. 8

SYSTEM FOR PROVIDING GAME-RELATED INFORMATION

CROSS REFERENCE TO RELATED APPLICATION

The present application claims the benefit of priority of U.S. Provisional Application No. 62/107,019 filed on Jan. 23, 2015, the entire disclosure of which is incorporated by reference herein.

FIELD OF THE INVENTION

The present application relates to a system for providing game-related information. More particularly, example aspects herein relate to systems, methods, and computer program products for providing, to a scoreboard and/or to a subscriber identified on a subscriber list stored in a database, game-related information entered by a scorekeeper.

DESCRIPTION OF RELATED ART

Nowadays, the variety of sporting games in which people participate is ever-increasing. For instance, it is not uncommon for a child to be active in multiple sports, such as hockey, soccer, baseball, football, and/or the like, throughout a given school year. The increase in game participation has given rise to a corresponding increase in game-related information (e.g., scoring information, statistics related to teams and/or individual players, and/or the like). Such game-related information may be of interest to those who have interest in the game but, for one reason or another, are unable to attend the game.

Given the foregoing, it would be beneficial to have an integrated means for a scorekeeper to input game-related information for wireless transmission to a scoreboard and generate an official game scoresheet, as well as for distributing on demand at least a portion of the game-related information to a plurality of interested subscribers (e.g., parents of children participating in the game, youth leagues and organizations, and/or the like).

BRIEF DESCRIPTION OF THE INVENTION

The example embodiments herein provide systems, methods, and computer program products for providing game-related information. In accordance with one example aspect herein, an electronic apparatus for providing game-related information includes a computer processor, a memory device, a display screen, a transmitter, and a communication interface. The memory device stores at least one piece of computer code executable by the computer processor and data used by the computer code. The transmitter enables information to be communicated to a scoreboard. The communication interface enables information to be communicated to subscribers identified on a subscriber list stored in a database of the memory device. The computer code includes code for providing a user interface on the display screen to enable a scorekeeper to input an information item relating to a game, controlling the transmitter to transmit the information item to the scoreboard, controlling the memory device to store the information item in a memory therein, and controlling the communication interface to transmit the information item to at least one subscriber identified on the subscriber list.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings.

FIG. 8 shows an example interface presenting an official game scoresheet, according to various example embodiments herein.

DETAILED DESCRIPTION OF EMBODIMENTS OF THE INVENTION

Figure 1:
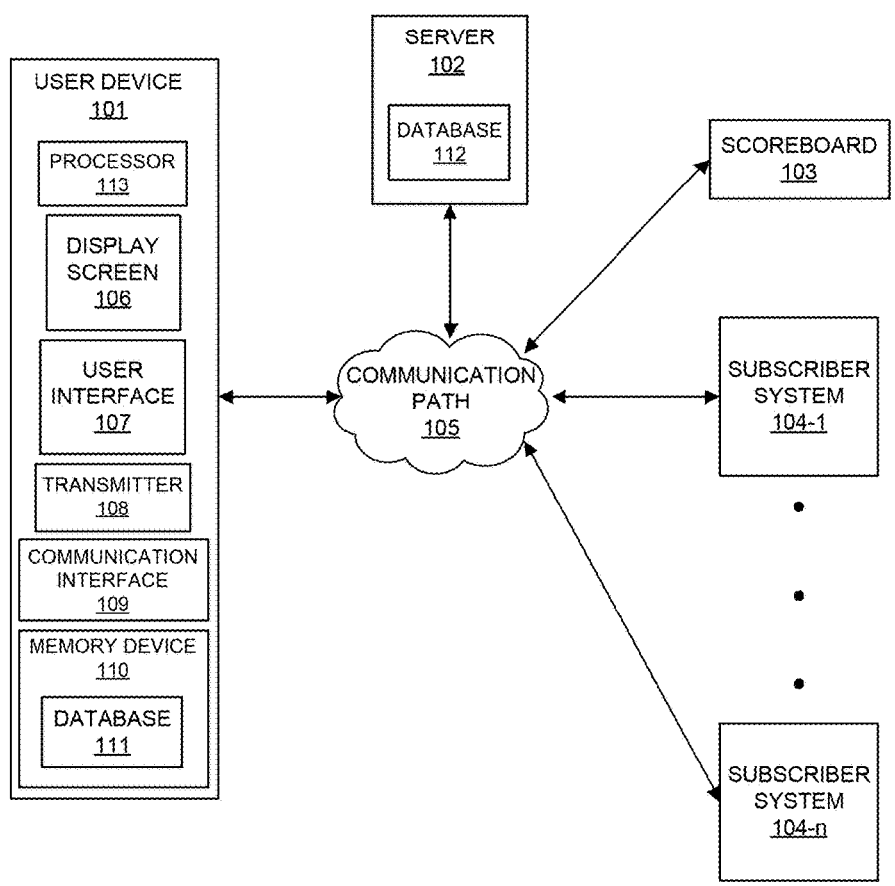
FIG. 1 shows an example arrangement of various components of a system for providing game-related information, according to various example embodiments herein.

FIG. 1 shows an example arrangement of various components of a system 100 for providing game-related information, according to an example embodiment herein. The system 100 includes a user device 101 (also referred to herein as an "electronic apparatus"), a server 102, a scoreboard 103, one or more subscriber system(s) 104-1 to 104-*n* (collectively 104), and a communication path 105, which may include one or more pathways.

The communication path 105 communicatively couples the user device 101 to one or more of the server 102, the scoreboard 103, and the subscriber system(s) 104, enabling data to be communicated therebetween. The communication path 105, in some example aspects, enables wireless communications and may include pathways employing one or more wireless communication protocols (e.g., a Zigbee® communication protocol, a spread spectrum communication protocol, a Bluetooth® communication protocol, and the like). In some example embodiments, the communication path 105 may include a publicly accessible network, such as the Internet.

Figure 2:
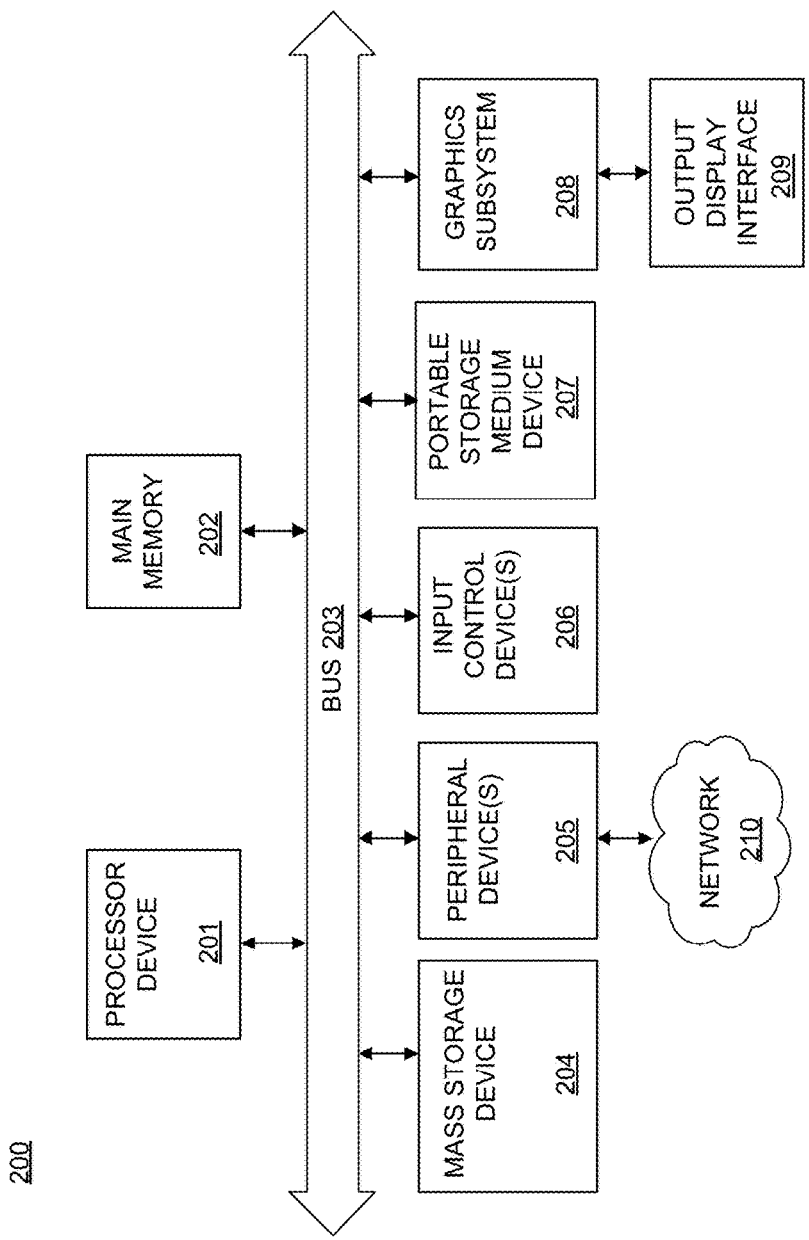
FIG. 2 is a block diagram of a computer for use with various example embodiments herein.

The user device 101 may be a general and/or special purpose computer (e.g., the computer system 200 described below in connection with FIG. 2), a mobile communication device (e.g., a smartphone), a laptop computer, a tablet computer, and/or any other user device suitable for a user to input information relating to a game, and for storing and transmitting the information to the scoreboard 103 and/or to the subscriber system(s) 104, in accordance with the example embodiments herein.

In one example embodiment, the user device 101 includes a processor 113, a display screen 106 (e.g., a touchscreen display), a user interface 107, a transmitter 108, a communication interface 109, a memory device 110, and a database 111. The database 111 may be included in the memory device 110 in some example embodiments herein. In another example embodiment herein, the user device 101 includes a communication port, such as a universal serial bus (USB) port (not shown in FIG. 1), and the transmitter 108 is a detachable unit that attaches to and detaches from the communication port.

In general, and as will be described in more detail below in the context of FIGS. 3 through 12, the user device 101 is an electronic device (e.g., a tablet computer) the processor 113 of which executes software (computer code) stored in the memory device 110 that (1) provides the user interface 107 by way of the display screen 106 by which a user (e.g., a scorekeeper) can input, during a game, an information item relating to the game; (2) causes the transmitter 108 to transmit the information item to the scoreboard 103; (3) causes the memory device 110 to store the information item therein; and (4) causes the communication interface 109 to transmit the information item to at least one subscriber system (also referred to herein as "subscriber") 104 identified on a subscriber list stored in the database 111 of the memory device 110.

The scoreboard 103 is a device (e.g., arranged so as to be in view of spectators of the game) that is configured to receive (e.g., wirelessly) from the user device 101 one or more information items relating to the game (e.g., a numerical score for the game, penalty information, clock control input), and to present the one or more information items to the spectators. The scoreboard 103 in some examples utilizes one or more wireless communication protocols (e.g., a Zigbee® communication protocol, a spread spectrum communication protocol, a Bluetooth® communication protocol, and the like) to receive the information items from the user device 101.

Each of the subscriber system(s) 104 is a device (e.g., a desktop computer, a laptop computer, a smartphone, a telephone) by which a subscriber identified on a subscriber list stored in the user device 101 and/or in a database 112 of the server 102 can receive (e.g., wirelessly) from the user device 101 one or more information items relating to the game. In some example embodiments herein, subscribers include one or a combination of: (1) a sports league to which the game belongs, (2) a parent of a player in the game, (3) a school to which a player of the game belongs; (4) a news organization, (5) a sports data agency, and (6) an individual who registered to receive game information.

In accordance with some examples herein, the one or more information items relating to the game includes an indication that an event has occurred during the game, and the event includes any one or a combination one of: (1) a player scoring one or more points, (2) a player assisting in scoring one or more points, (3) a player performing a predetermined play, (4) an injury to player, (5) a player substitution, (5) a foul or a penalty called on a player or a team, (6) a time-out called by a team, (7) a weather-related delay, (8) an official end of the game, (9) a scoring change, (10) a change in team having a leading score, (11) a tie score, and (12) an overtime extension of the game. The information item for the event may include, for example, at least one of: (1) an official time corresponding to when the event occurred, (2) a time period of the game when the event occurred, and (3) a current score of the game when the event occurred.

The server 102 (which, as mentioned below is optional, and may not be included in some example embodiments herein) may be a general and/or special purpose computer (e.g., a computer system 200 described below). The software executed by the user device 101 may be Web-based software (e.g., software hosted by the server 102), for easy access by any user, local software hosted by the user device 101, and/or a combination of Web-based software and local software. The server 102 is included in the system 100 in some example embodiments. However, in other example embodiments the functionality of the server 102 is implemented by the user device 101 instead and the server 102 need not be included in the system 100.

The server 102, in some examples herein, may be a push server, programmed to use push technology to push one or more information items received from the user device 101 to one or a combination of: an email address, a telephone number, and a web-based application of a subscriber system 104.

In some example aspects herein, the server 102 includes a database 112 that operates in the same manner as the database 111 of the user device 101 described above, and stores the same information as the database 111 described above. For example, the database 112 may be used in lieu of the database 111, or, in some examples, may serve as a remote backup of the information stored in the database 111.

In another example herein, the code for controlling the communication interface 109 causes the information item to be transmitted to the at least one subscriber system 104 via one or a combination of: (1) an email message, (2) a text message, (3) a social media message, (4) a file transfer to an external storage unit.

In one example, the code for controlling the communication interface 109 causes the electronic apparatus 101 to communicate with the push server 102, which is programmed to use push technology to push the information item to one or a combination of: (1) an email address, (2) a telephone number, and (3) a web-based application.

The information item, according to one example, relates to a particular player of the game, and the code for controlling the communication interface 109 causes the information item to be transmitted to a subscriber system 104 of a subscriber who registered to receive game information relating to the particular player.

The memory device 110 in some examples, stores a plurality of information items relating to the game in a datafile for the game, and the code for controlling the communication interface 109 causes the datafile to be transmitted to a subscriber system 104 of the at least one subscriber identified on the subscriber list. The datafile, in other examples, includes a complete set of information items relating to the game, and also includes a certification by at least one of: (1) the scorekeeper, (2) a referee for the game, and (3) a coach or a manager of each team of the game.

In some example embodiments herein, the computer code of the memory device 110 further includes code that, when executed by the processor 113, determines, based on preference information stored in the database 111 for each subscriber on the subscriber list, whether the information item is to be transmitted to the subscriber system 104 of the subscriber, the preference information indicating types of information to be transmitted or types of information not to be transmitted to the subscriber. The preference information for the subscriber, in one example, is designated by the subscriber when the subscriber registers to receive game-related information. The preference information may include, for example, at least one of: (1) an email address of the subscriber, (2) a telephone number of the subscriber, (3) a social-media account name of the subscriber, and (4) a web address of the subscriber.

In one example, a subscriber can be added to the subscriber list by completing a registration process to register to receive game related information, and the registration process can be completed electronically using an Internet-accessible web page.

The computer code stored in the memory device 110, in accordance with one example herein, further includes code for controlling the communication interface 109 to receive updated subscriber information, and controlling the memory device 110 to update the subscriber list stored in the database 111 based on the updated subscriber information.

In yet another example herein, the computer code stored in the memory device 110 further includes code for calculating game statistics based a plurality of information items relating to the game that are stored in the memory device 110, and controlling the memory device 110 to store the game statistics. The computer code may further include code for controlling the communication interface 109 to transmit the game statistics to at least one subscriber identified on the subscriber list.

The transmitter 108, in one example embodiment, transmits the information item to the scoreboard 103 via one or more wireless communication protocols, such as a Zigbee® communication protocol, a spread spectrum communication protocol, and/or a Bluetooth® communication protocol.

Having described a system 100 for providing game-related information, according to an example embodiment herein, reference will now be made to FIG. 2, which shows a block diagram of a general and/or special purpose computer system 200 that may be employed in accordance with some of the example embodiments herein. The computer system 200 may be, for example, a user device, a user computer, a client computer and/or a server computer, among other things. In some example embodiments herein, the computer system 200 may further represent the user device 101, the server 102, the scoreboard 103, and/or one or more of the subscriber systems 104-1 to 104-$n$ described above in connection with FIG. 1.

The computer system 200 may include, without limitation, a computer processor 201, a main memory 202, and an interconnect bus 203. The computer processor 201 may include without limitation a single microprocessor, or may include a plurality of microprocessors for configuring the computer system 200 as a multi-processor system. The main memory 202 stores, among other things, instructions and/or data for execution by the processor device 201. The main memory 202 may include banks of dynamic random access memory (DRAM), as well as cache memory.

The computer system 200 may further include mass storage device(s) 204, peripheral device(s) 205, input control device(s) 206, portable storage medium device(s) 207, graphics subsystem(s) 208, and/or one or more output display(s) 209. For explanatory purposes, all components in the computer system 200 are shown in FIG. 2 as being coupled via the bus 203. However, the computer system 200 is not so limited. Devices of the computer system 200 may be coupled via one or more data-transport devices known in the art. For example, the computer processor 201 and/or the main memory 202 may be coupled via a local microprocessor bus. The mass storage device(s) 204, the peripheral device(s) 205, the portable storage medium device(s) 207, and/or the graphics subsystem(s) 208 may be coupled via one or more input/output (I/O) buses. The mass storage device(s) 204 may be nonvolatile storage device(s) for storing data and/or instructions for use by the computer processor 201. The mass storage device(s) 204 may be implemented, for example, with one or more magnetic disk drive(s), solid state disk drive(s), and/or optical disk drive (s). In a software-related embodiment, at least one mass storage device 204 is configured for loading contents of the mass storage device 204 into the main memory 202.

Each portable storage medium device 207 operates in conjunction with a nonvolatile portable storage medium, such as, for example, a compact disc with a read-only memory (CD-ROM) or a non-volatile storage chip (Flash), to input and output data and code to and from the computer system 200. In some embodiments, the software for storing an internal identifier in metadata may be stored on a portable storage medium, and may be inputted into the computer system 200 via the portable storage medium device 207. The peripheral device(s) 205 may include any type of computer support device, such as, for example, an input/output (I/O) interface configured to add additional functionality to the computer system 200. For example, the peripheral device(s) 205 may include a network interface card for interfacing the computer system 200 with a network 210.

The input control device(s) 206 provide among other things, a portion of the user interface for a user of the computer system 200. The input control device(s) 206 may include a keypad, a cursor control device, a touch sensitive surface coupled with the output display(s) 209 or stand-alone, a camera, a microphone, infrared sensors, knobs, buttons, and the like. The keypad may be configured for inputting alphanumeric characters and/or other key information. The cursor control device may include, for example, a mouse, a trackball, a stylus, and/or cursor direction keys. In order to display textual and graphical information, the computer system 200 may utilize the graphics subsystem(s) 208 and the output display(s) 209. The output display(s) 209 may include a cathode ray tube (CRT) display, a liquid crystal display (LCD), a projector device, and the like. Each graphics subsystem 208 receives textual and graphical information, and processes the information for output to at least one of the output display(s) 209.

Each component of the computer system 200 may represent a broad category of a computer component of a general and/or special purpose computer. Components of the computer system 200 are not limited to the specific implementations provided here.

Portions of the example embodiments of the invention may be conveniently implemented by using a conventional general purpose computer, a specialized digital computer, and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein, which can be used to control, or cause, a computer to perform any of the procedures of the example embodiments of the invention. The storage medium may include without limitation a floppy disk, a mini disk, an optical disc, a Blu-ray Disc™, a DVD, a CD-ROM, a micro drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the general and/or special computer or microprocessor, and for enabling the computer or microprocessor to interact with a human user or other mechanism utilizing the results of the example embodiments of the invention. Such software may include, without limitation, device drivers, operating systems, and user applications. Additionally, such computer readable media further includes software for performing example aspects of the invention, as described herein.

Included in the programming and/or software of the general and/or special purpose computer or microprocessor are software modules for implementing the procedures described herein.

Having described a general and/or special purpose computer 200 that may be employed in accordance with some of the example embodiments herein, reference will now be made to FIG. 3, which illustrates exemplary functional modules that may be included in a memory device 301, in accordance with example embodiments herein. In some example embodiments, the memory device 301 is included in the user device 101 and/or system 200 described above in the context of FIGS. 1 and 2, further represents the memory device 110 and/or the main memory 202 in part or in whole, and is used for providing game-related information. For example, although not shown in FIG. 3 for purposes of convenience, the memory device 301 is coupled to a computer processor (e.g., the computer processor 113 and/or 201) that, in turn, is coupled to one or more displays (e.g., the display screen 106 and/or the output display(s) 209) and optionally to one or more capabilities to exchange data over a network (e.g., the communication path 105 and/or the network 210). In one example embodiment, the display device 209 is structured to display a graphical interface (e.g., a GUI, such as the user interface 107) to a user based on computer code (e.g., modules 302 through 310) executed by the computer processor 113 and/or 201. An input device (e.g., the touchscreen display screen 106 and/or the input control device 206) is structured to receive information from the user via the user device 101. In some example embodiments herein, one or more of the modules 302 through 310 may be used to implement one or more of the functions associated with one or more of blocks 401 through 405, blocks 1101 through 1103, and/or blocks 1201 through 1203, which are described in further detail below in the context of FIGS. 4, 11, and/or 12.

The example apportionment of functionality to the modules 302 through 310 is provided for convenience only, and should not be construed as limiting. Other example apportionments of functionality are contemplated, for example, where the functionality of certain ones of the modules 302 through 310 is combined with and/or overlaps with the functionality of other ones of the modules 302 through 310.

Figure 3:
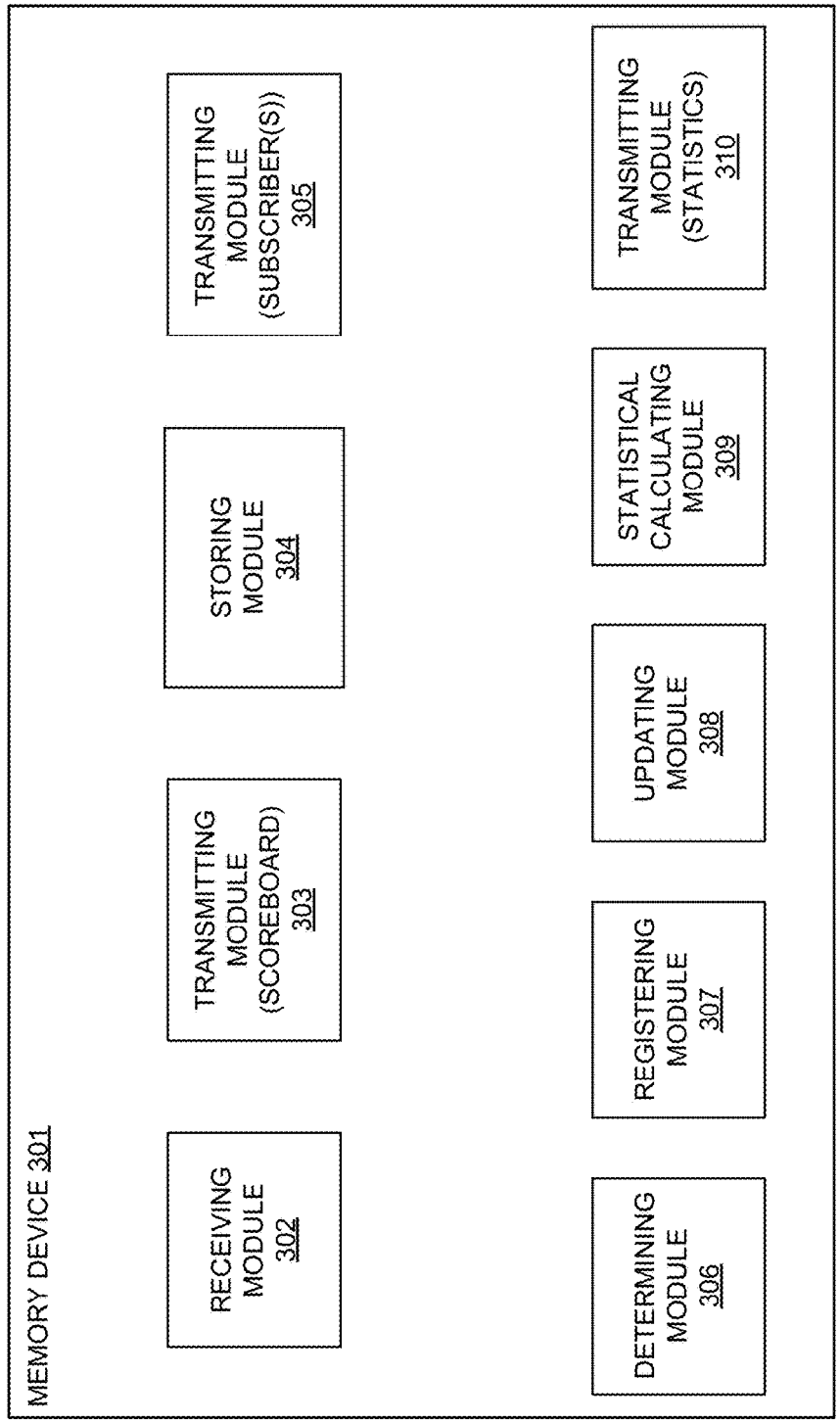
FIG. 3 illustrates examples of functional modules that may be included in a memory device and used for providing game-related information, according to various example embodiments herein.

As shown in FIG. 3, the modules stored within the memory device 301 include a receiving module 302, a transmitting module (scoreboard) 303, a storing module 304, a transmitting module (subscriber(s)) 305, a determining module 306, a registering module 307, an updating module 308, a statistical calculating module 309, and a transmitting module (statistics) 310. As will be described in further detail below, each of the modules 302 through 310 includes computer-executable code that imparts functionality to the user device 101 and/or computer system 200 when executed by the computer processor 113 and/or 201 as well as data related to that code. Additionally, the memory device 301 stores computer programs and data for applications that a user may interact with via one or more input devices 206.

In one example embodiment herein, the receiving module 302 receives, by way of a user interface provided on a display screen of an electronic device, an information item input by a scorekeeper and relating to a game. The transmitting module (scoreboard) 303 transmits the information item to a scoreboard. In another example, the transmitting module (scoreboard) 303 transmits the information item from the electronic device to the scoreboard via a wireless communication protocol, such as, for example: (1) a Zigbee® communication protocol, (2) a spread spectrum communication protocol, and/or (3) a Bluetooth® communication protocol. The storing module 304 stores the information item in a memory of the electronic device.

The transmitting module (subscriber(s)) 305 controls a communication interface of the electronic device to transmit the information item to a system of at least one subscriber identified on a subscriber list stored in a database of the memory. The at least one subscriber includes, in some examples herein, any one or a combination of: (1) a sports league to which the game belongs, (2) a parent of a player in the game, (3) a school to which a player of the game belongs; (4) a news organization, (5) a sports data agency, and (6) an individual who registered to receive game information.

In some examples herein, the transmitting module (subscriber(s)) 305 causes the information item to be transmitted to the at least one subscriber via one or a combination of: (1) an email message, (2) a text message, (3) a social media message, and (4) a file transfer to an external storage unit.

The transmitting module (subscriber(s)) 305, in another example herein, causes the electronic device to communicate with a push server programmed to use push technology to push the information item to one or a combination of: (1) an email address, (2) a telephone number, and (3) a web-based application.

In accordance with some example aspects herein, the information item relates to a particular player of the game, and the transmitting module (subscriber(s)) 305 causes the information item to be transmitted to a subscriber who registered to receive game information relating to the particular player.

In another example, the storing module 304 causes the database 111 to store a plurality of information items relating to the game in a datafile for the game, and the transmitting module (subscriber(s)) 305 causes the datafile to be transmitted to the at least one subscriber identified on the subscriber list. The datafile may include, for example, a complete set of information items relating to the game, as well as a certification by at least one of: (1) the scorekeeper, (2) a referee for the game, and (3) a coach or a manager of each team of the game.

In some examples herein, the information item includes an indication that an event has occurred during the game, and the event includes any one or a combination of: (1) a player scoring one or more points, (2) a player assisting in scoring one or more points, (3) a player performing a predetermined play, (4) an injury to a player, (4) a player substitution, (5) a foul or a penalty called on a player or a team, (6) a time-out called by a team, (7) a weather-related delay, (8) an official end of the game, (9) a scoring change, (10) a change in team having a leading score, (11) a tie score, and (12) an overtime extension of the game. The information item for the event may include, for example, at least one of: (1) an official time corresponding to when the event occurred, (2) a time period of the game when the event occurred, and (3) a current score of the game when the event occurred.

In one example embodiment herein, the determining module 306 determines, based on preference information stored in the database for each subscriber on the subscriber list, whether the information item is to be transmitted to the subscriber, the preference information indicating types of information to be transmitted or types of information not to be transmitted to the subscriber. The preference information for the subscriber is designated by the subscriber when the subscriber registers to receive game-related information. The preference information may include, for example, any one or a combination of: (1) an email address of the subscriber, (2) a telephone number of the subscriber, (3) a social-media account name of the subscriber, and (4) a web address of the subscriber.

In another example embodiment herein, the registering module 307 enables a subscriber to be added to the subscriber list by completing a registration process to register to receive game-related information. The registration process can be completed electronically using an Internet-accessible web page.

In a further aspect herein, the updating module 308 receives updated subscriber information, and controls the memory to update the subscriber list stored in the database based on the updated subscriber information.

In another example aspect, the statistical calculating module 309 calculates game statistics based a plurality of information items relating to the game that are stored in the memory, and causes the memory to store the game statistics. The transmitting module (statistic(s)) 310, in one example, causes the communication interface to transmit the game statistics to at least one subscriber identified on the subscriber list.

Figure 4:
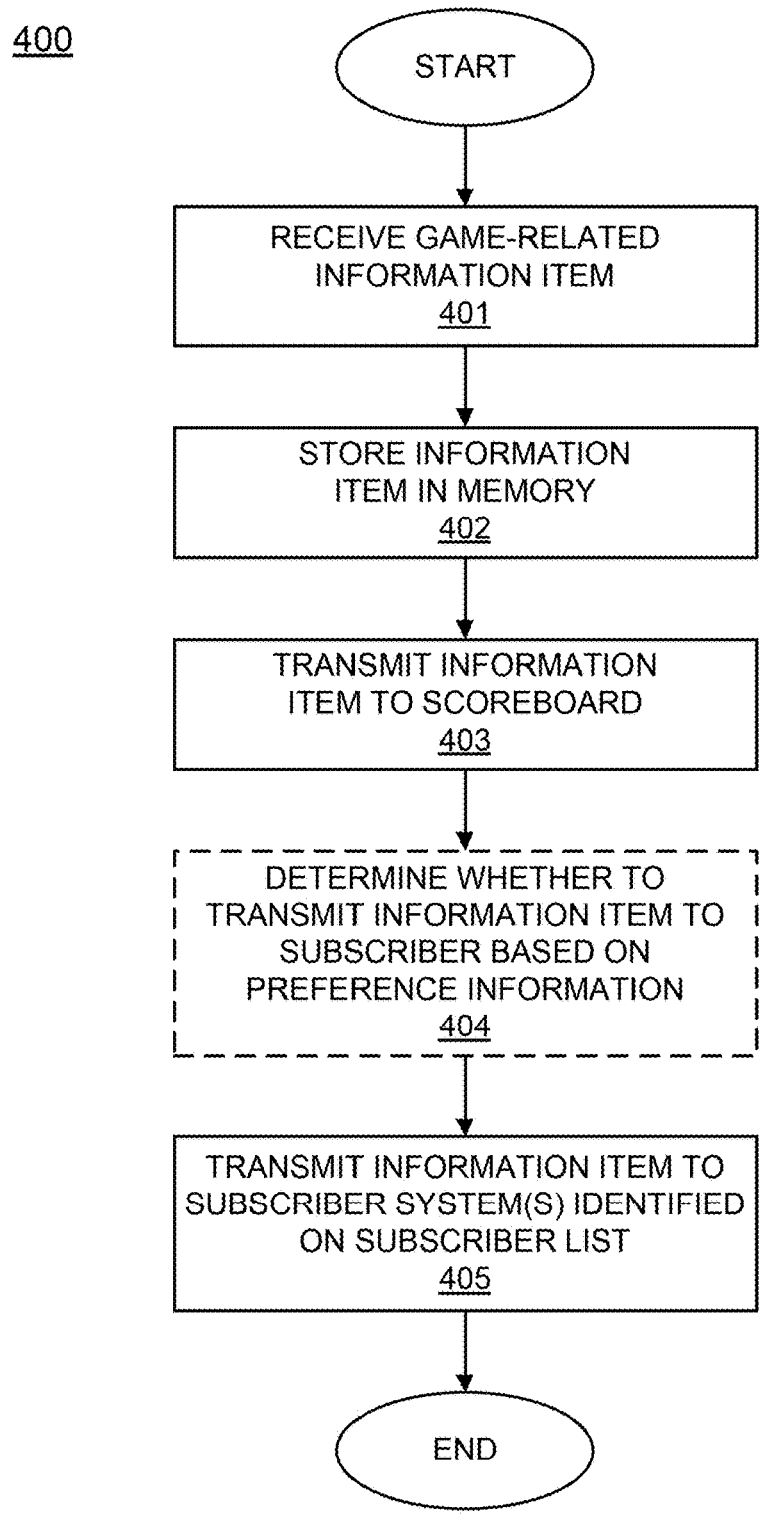
FIG. 4 is a flowchart illustrating an example procedure for providing game-related information, according to various example embodiments herein.

Reference will now be made to FIG. 4, which shows a flowchart illustrating an example procedure 400 for communicating game-related information. At block 401, an electronic device (e.g., the user device 101 of FIG. 1) receives one or more information items relating to a game and inputted by a scorekeeper during the game. The electronic device 101, in accordance with some examples herein, may be any one of: (1) a desktop computer, (2) a laptop computer, (3) a tablet computer, and/or (4) a smartphone.

Figure 5:
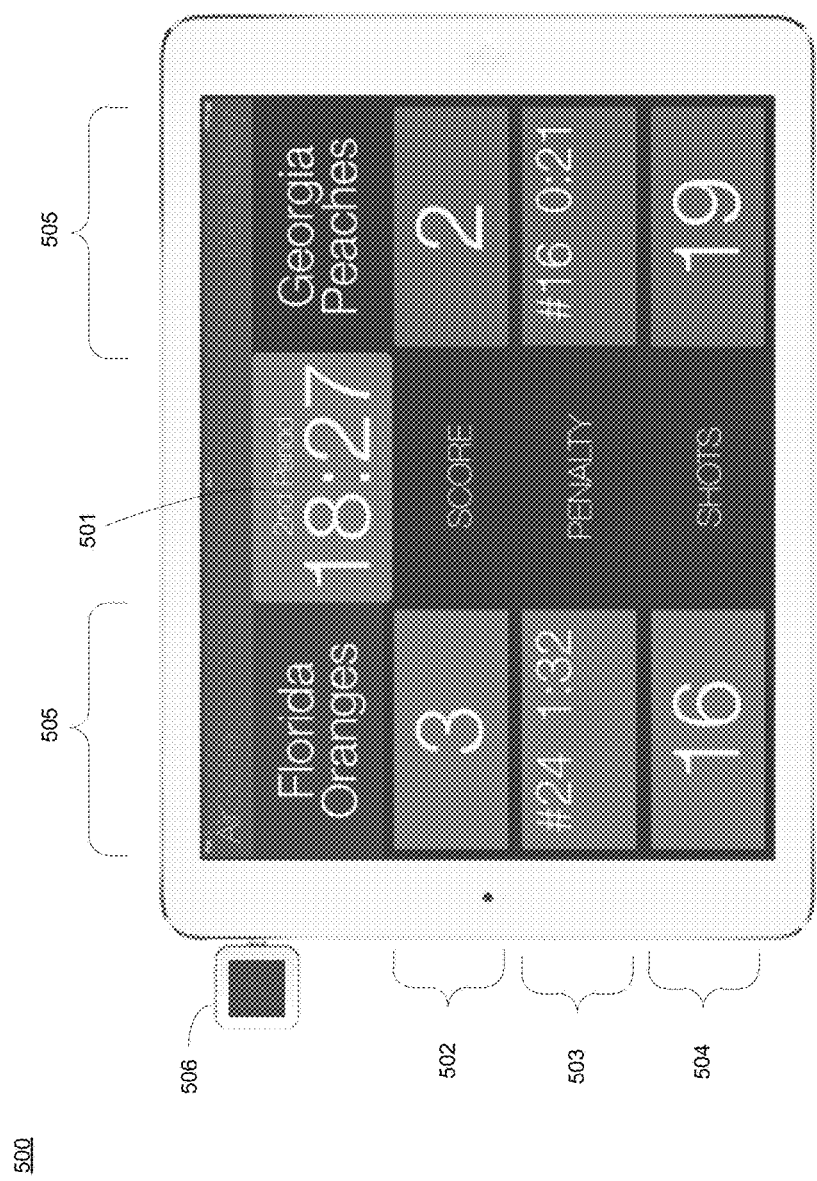
FIG. 5 shows an example interface for enabling a scorekeeper to input an information item relating to a game, according to various example embodiments herein.

Before continuing to describe the example procedure 400, reference will be made to FIG. 5 through FIG. 7 to describe some example interfaces that may be employed in connection with the procedure 400. An example interface 500 for enabling a scorekeeper to input an information item relating to a game, in accordance with various example embodiments herein, is shown in FIG. 5. The example items of information relating to a game that are shown in the interface 500 include a game clock 501, score information 502, penalty information 503, and shot information 504, as well as team name information 505. Also shown in FIG. 5 is a detachable transmitter module 506 (which may further represent the transmitter 108 described above) coupled to a USB communication port of the user device 101.

Figure 6:
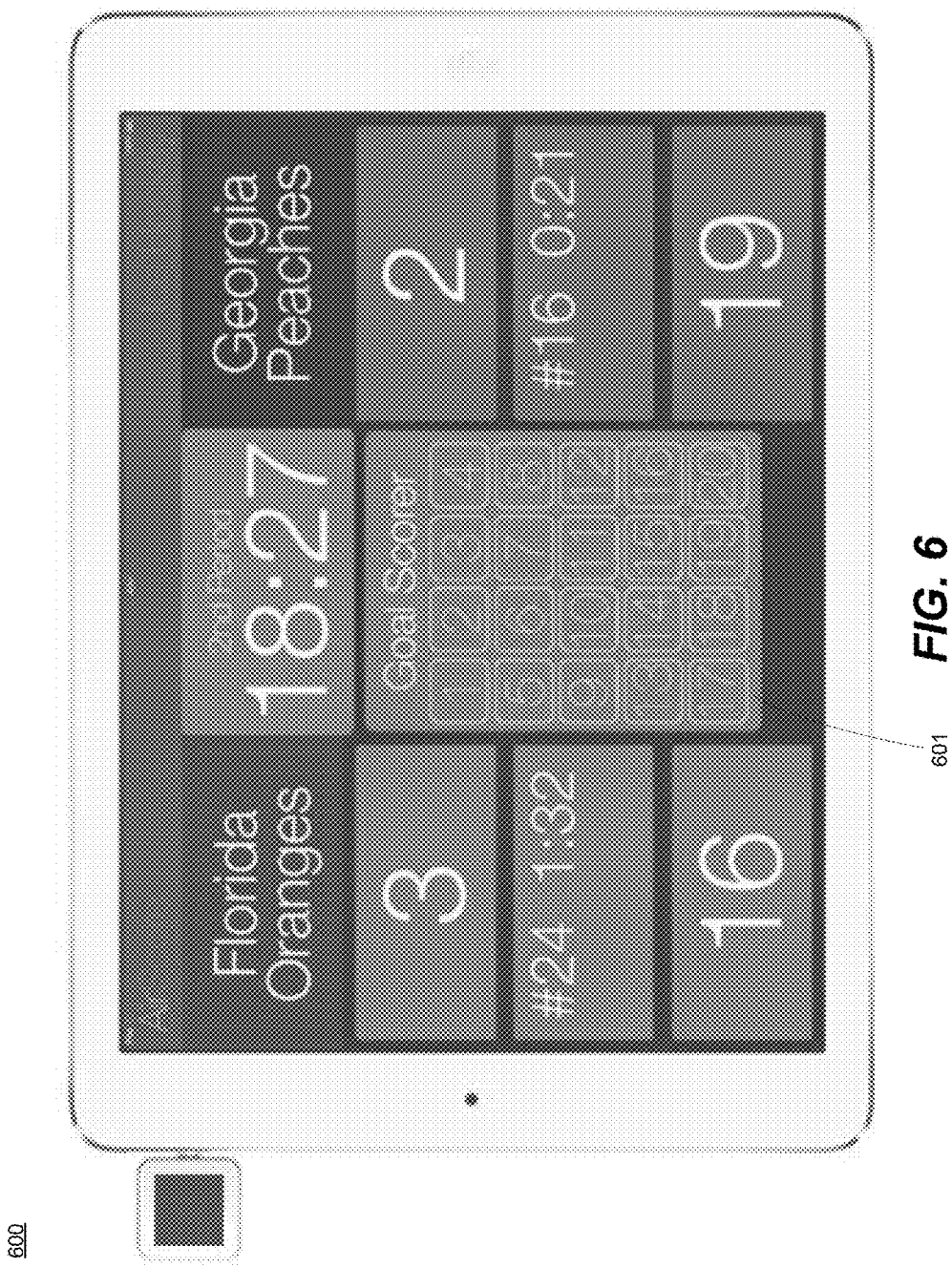
FIG. 6 shows another example interface for enabling a scorekeeper to input an information item relating to a game, according to various example embodiments herein.

FIG. 6 shows another example interface 600 for enabling a scorekeeper to input an information item relating to a game, in accordance with various example embodiments herein. In addition to some of the information described above in connection with the interface 500, the interface 600 includes a goal scorer interface 601 that enables the scorekeeper to input a score for the game.

Figure 7:
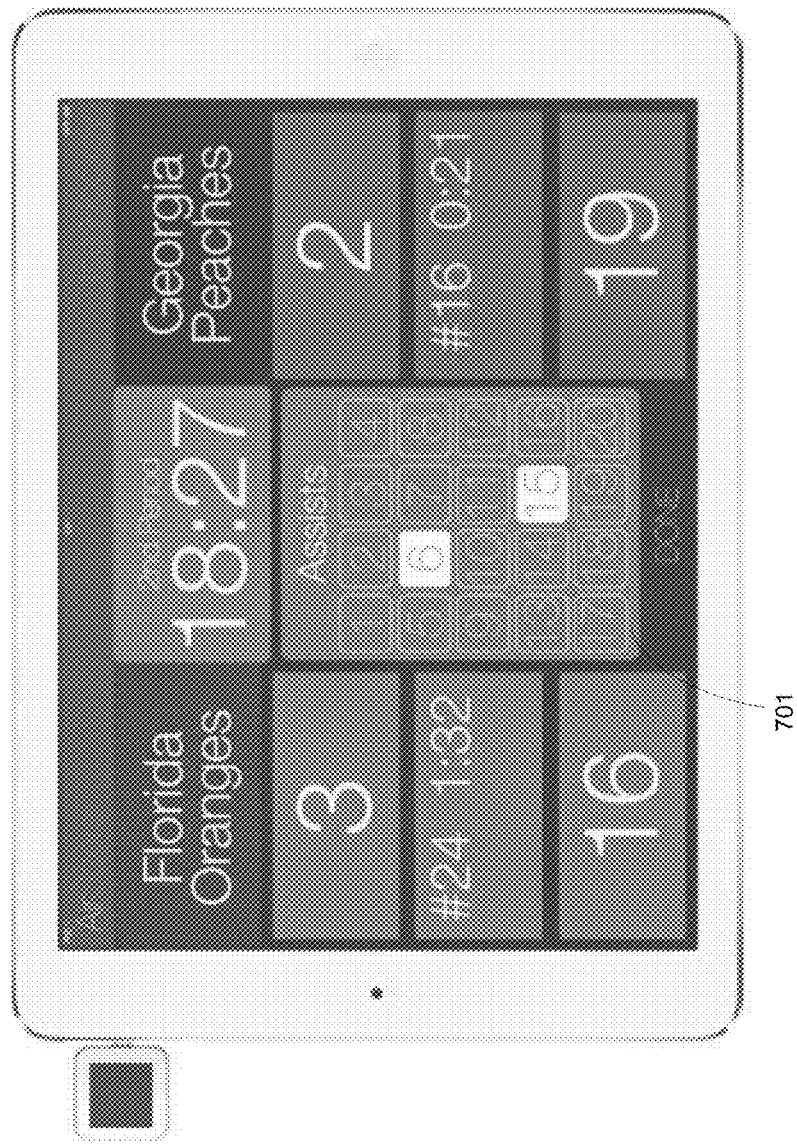
FIG. 7 shows yet another example interface for enabling a scorekeeper to input an information item relating to a game, according to various example embodiments herein.

FIG. 7 shows yet another example interface 700 for enabling a scorekeeper to input an information item relating to a game, in accordance with various example embodiments herein. In addition to some of the information described above in connection with the interfaces 500 and 600, the interface 700 includes an assist interface 701 that enables the scorekeeper to input assist information for the game.

Referring now back to FIG. 4, at block 402, the information item received at block 401 is stored in a file in the database 111 of the memory device 110 of the electronic device 101. At block 403, the information item received at block 401 is transmitted the from the electronic device 101 to a scoreboard (e.g., the scoreboard 103 of FIG. 1).

At block 404 (which is optional), a determination is made, based on preference information stored in the database for each subscriber on the subscriber list, of whether the information item is to be transmitted to the subscriber, the preference information indicating types of information to be transmitted or types of information not to be transmitted to the subscriber. The preference information for the subscriber may be, for example, designated by the subscriber when the subscriber registers to receive game-related information. The preference information includes at least one of: (1) an email address of the subscriber, (2) a telephone number of the subscriber, (3) a social-media account name of the subscriber, and (4) a web address of the subscriber.

At block 405, the information item is transmitted from the electronic device 101 to one or more system(s) of at least one subscriber identified on a subscriber list stored in a database (e.g., the database 111 of FIG. 1) of the memory device 110. As mentioned above, the at least one subscriber may include, for example, any one or a combination of: (1) a sports league to which the game belongs, (2) a parent of a player in the game, (3) a school to which a player of the game belongs; (4) a news organization, (5) a sports data agency, and (6) an individual who registered to receive game information. The information item is transmitted to the subscriber via one or a combination of: (1) an email message, (2) a text message, (3) a social media message, and/or (4) a file transfer to an external storage unit. In one example embodiment, the electronic device 101 communicates with a push server programmed to use push technology to push the information item to one or a combination of: (1) an email address, (2) a telephone number, and (3) a web-based application.

In another example embodiment herein, the information item relates to a particular player of the game, and, at block 405, the information item is transmitted to a subscriber who registered to receive game information relating to the particular player.

In one example herein, at block 405, a wireless communication protocol is utilized in transmitting the information item from the electronic device 101 to the scoreboard 103. The wireless communication protocol may be, for example, any one of: (1) a Zigbee® communication protocol, (2) a spread spectrum communication protocol, and (3) a Bluetooth® communication protocol.

In one example, at block 402 (described above), a plurality of information items relating to the game are stored in a datafile for the game, and, at block 405, the datafile is transmitted to the at least one subscriber identified on the subscriber list. The datafile may include, for example, a complete set of information items relating to the game, as well as a certification by at least one of: (1) the scorekeeper, (2) a referee for the game, and (3) a coach or a manager of each team of the game.

Figure 8:
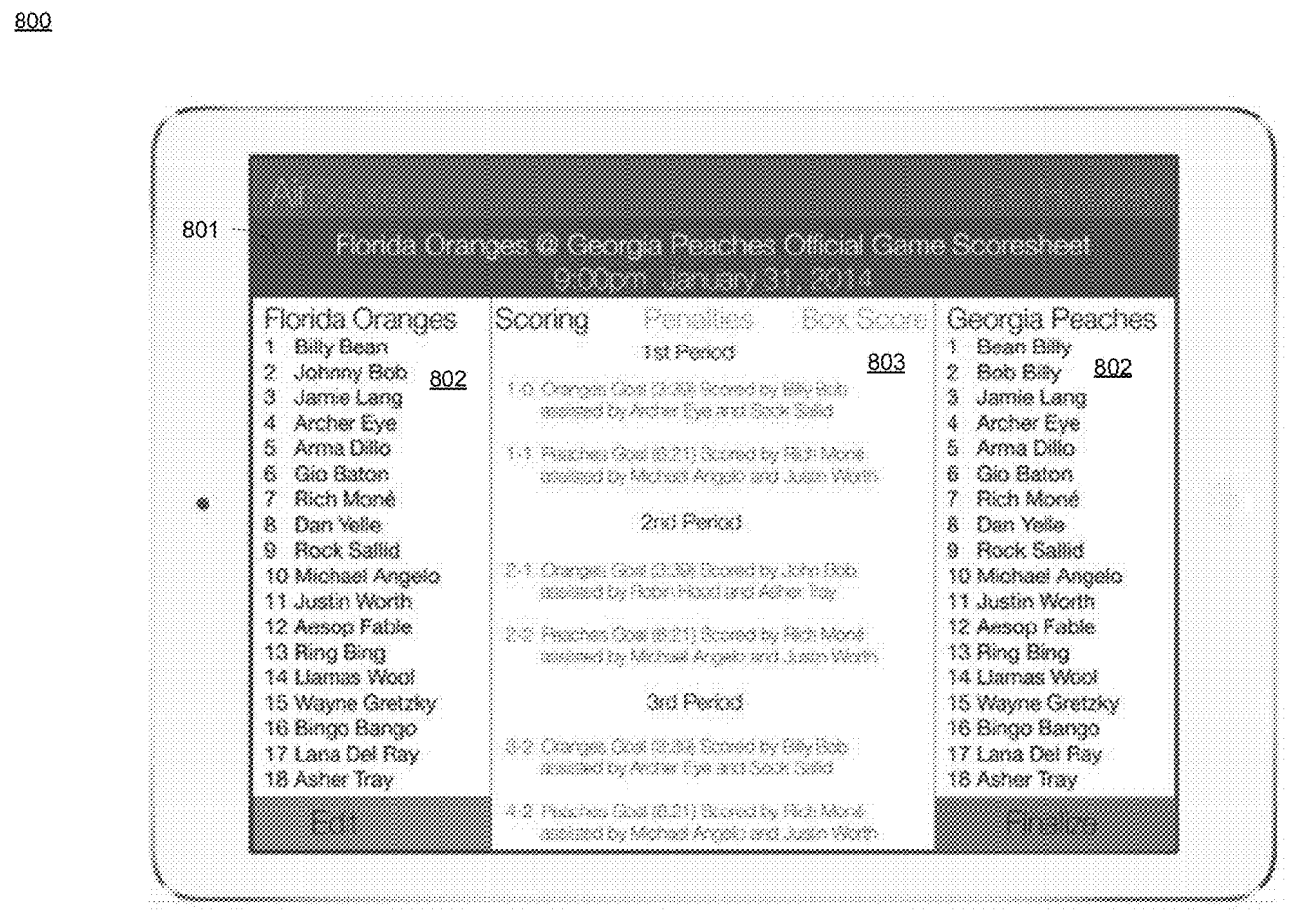
Figure 9:
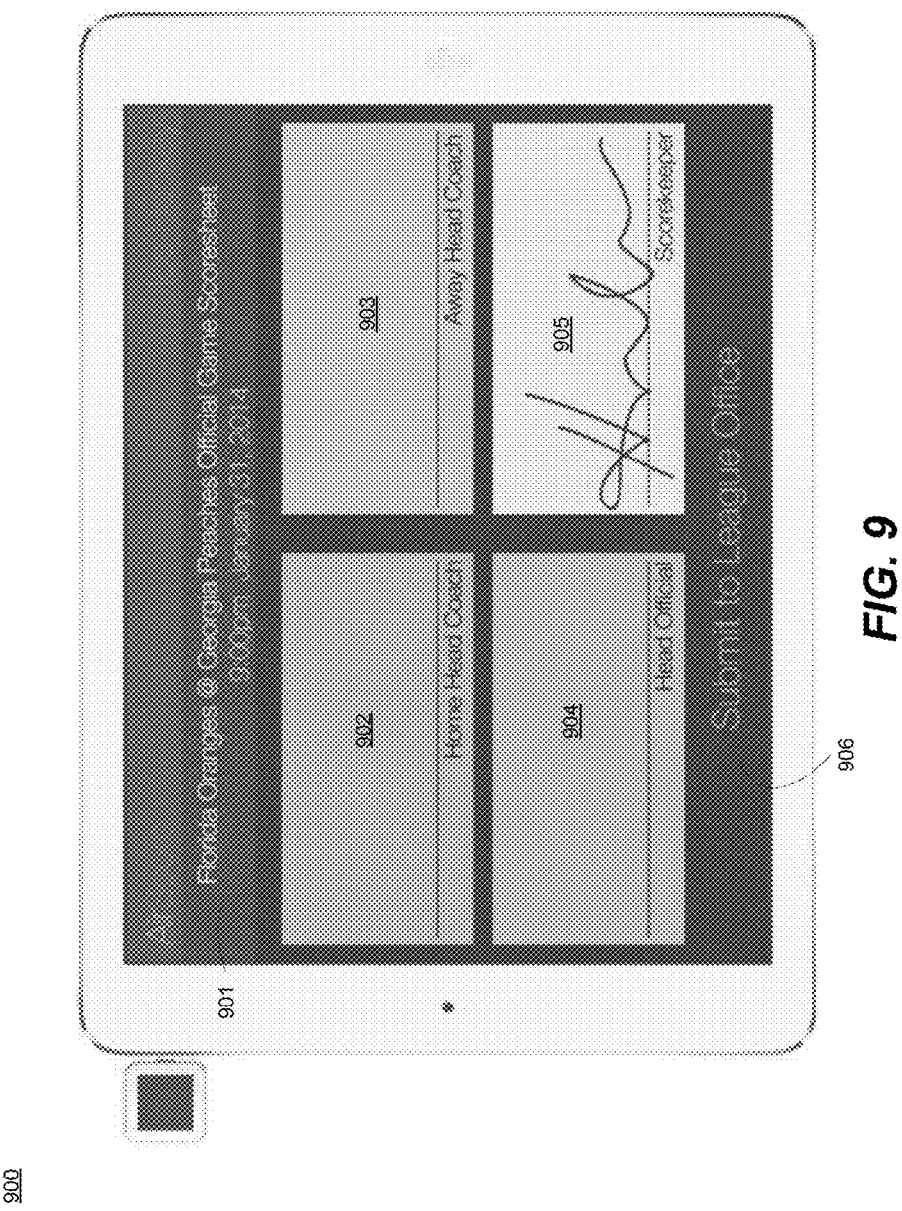
FIG. 9 shows an example interface for enabling a scorekeeper, a referee, and/or a coach, to certify a game scoresheet, according to various example embodiments herein.

Reference will be made to FIG. 8 and FIG. 9 to describe some example interfaces that may be employed in connection with the procedure 400. An example interface 800 presenting an official game scoresheet, in accordance with various example embodiments herein, is shown in FIG. 8. The information shown in the interface 800, in one example, represents a plurality of information items relating to the game that are stored in the datafile for the game, and that can be transmitted to the at least one subscriber identified on the subscriber list. For example, the information includes heading information 801, team member information 802, and a scoring summary 803 broken down by the periods of the game.

FIG. 9 shows an example interface 900 for enabling a scorekeeper, a referee, and/or a coach, to certify a game scoresheet (e.g., the game scoresheet 800 shown in FIG. 8), in accordance with various example embodiments herein. The interface 900 includes header information 901 as well as fields 902, 903, 904, and 905, in which signatures may be entered for a home head coach, an away head coach, a head official (e.g., referee), and a scorekeeper, respectively. Also included in the interface 900 is a button 906 that, upon being selected, causes the datafile and/or the signatures to be submitted to a league office (or a computer system of a league office).

As mentioned above, in some example embodiments herein, the information item includes an indication that an event has occurred during the game, and the event includes at least one of: (1) a player scoring one or more points, (2) a player assisting in scoring one or more points, (3) a player performing a predetermined play, (4) an injury to player, (5) a player substitution, (6) a foul or a penalty called on a player or a team, (7) a time-out called by a team, (8) a weather-related delay, (9) an official end of the game, (10) a scoring change, (11) a change in team having a leading score, (12) a tie score, and (13) an overtime extension of the game. In another example, the information item for the event may include at least one of: (1) an official time corresponding to when the event occurred, (2) a time period of the game when the event occurred, and/or (3) a current score of the game when the event occurred.

Figure 10:
FIG. 10 shows an example interface by which a game-related information item is presented to a subscriber, according to various example embodiments herein.

FIG. 10 shows an example interface 1000 by which a game-related information item (e.g., an indication that an event has occurred during the game) 1001 can be presented to a subscriber system 104, according to various example embodiments herein.

Figure 11:
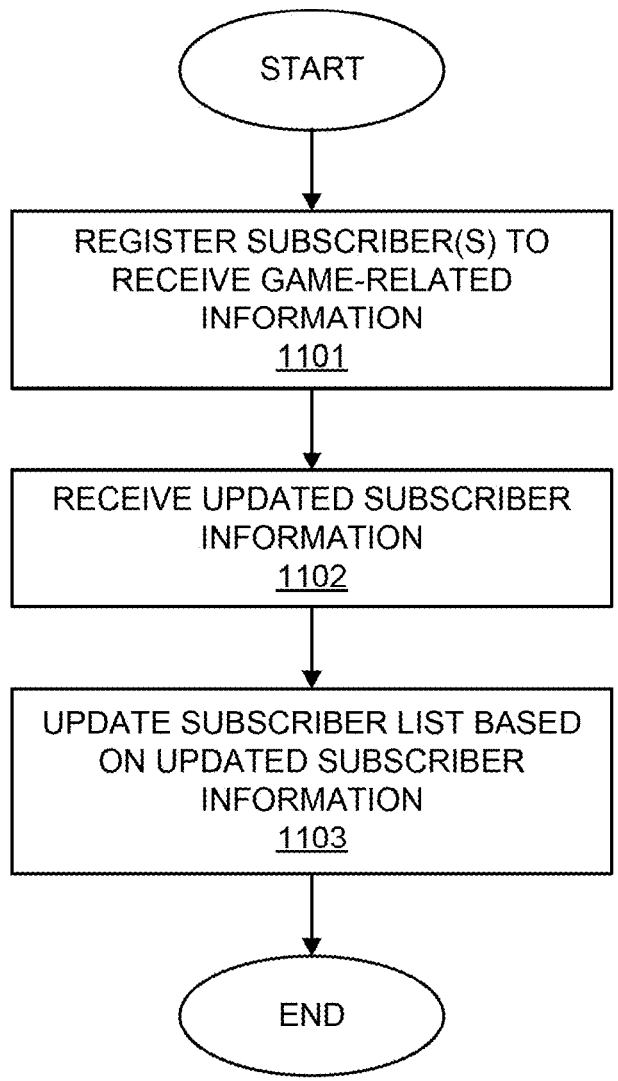
FIG. 11 is a flowchart illustrating an example procedure for registering subscribers and updating subscriber lists, according to various example embodiments herein.

Reference will now be made to FIG. 11, which shows a flowchart illustrating an example procedure 1100 for registering subscribers and updating subscriber lists, according to various example embodiments herein. At block 1101, a subscriber is added to the subscriber list by completing a registration process to register to receive game-related information. The registration process, for example, can be completed electronically using an Internet-accessible web page. At block 1102, updated subscriber information is received at the electronic device, and, at block 1103, the subscriber list stored in the database is updated based on the updated subscriber information received at block 1102.

Figure 12:
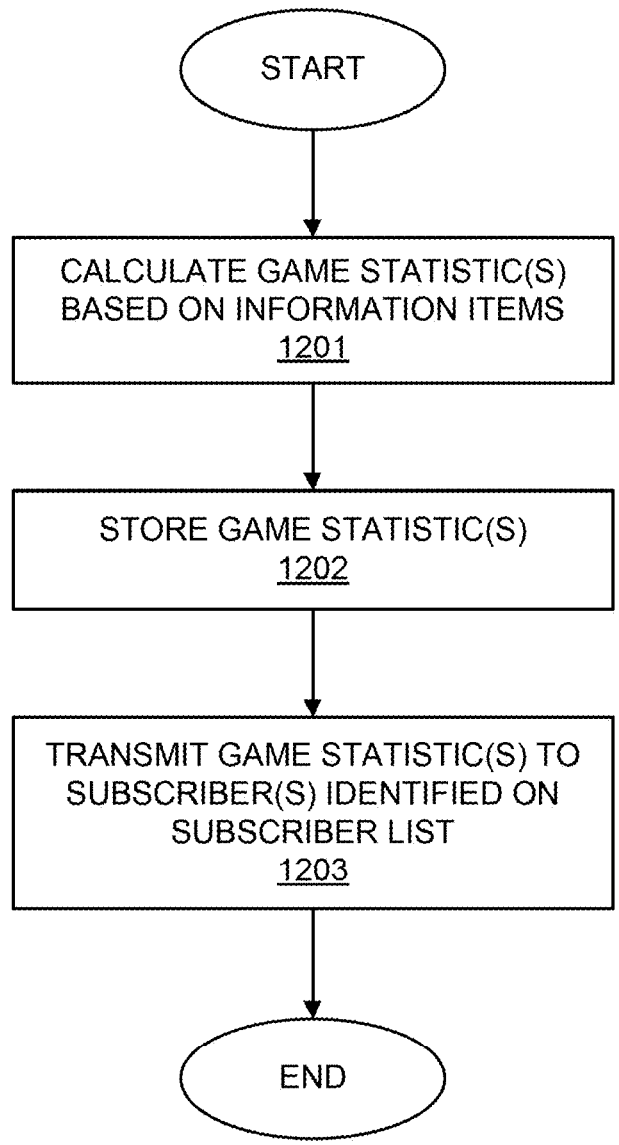
FIG. 12 is a flowchart illustrating an example procedure for calculating, storing, and transmitting game statistics, according to various example embodiments herein.

Reference will now be made to FIG. 12, which shows a flowchart illustrating an example procedure 1200 for calculating, storing, and transmitting game statistics, according to various example embodiments herein. At block 1201, game statistics are calculated based a plurality of information items relating to the game that are stored in the memory. At block 1202, the game statistics calculated at block 1201 are stored in the memory. At block 1203, the game statistics calculated at block 1201 are transmitted to at least one subscriber identified on the subscriber list.

As can be appreciated in view of the above, the example embodiments described herein provide systems, methods, and computer program products for communicating game-related information. Some example aspects herein provide an integrated means for a scorekeeper to input game-related information for wireless transmission to a scoreboard and generate an official game scoresheet, as well as for distributing on demand at least a portion of the game-related information to a plurality of interested subscribers (e.g., parents of children participating in the game, youth leagues and organizations, and/or the like).

While various example embodiments have been described above, it should be understood that they have been presented by way of example, and not limitation. It is apparent to persons skilled in the relevant art(s) that various changes in form and detail can be made therein. Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for communicating game-related information, the method comprising steps of:
receiving, at an electronic device, information items relating to a game, the information items being inputted by a scorekeeper during the game;
transmitting at least some of the information items from the electronic device to a scoreboard;
storing the information items in a memory of the electronic device; and
transmitting customized information from the electronic device to electronic devices of subscribers identified on a subscriber list stored in a database of the memory, the customized information being transmitted directly using non-web-based technology and indirectly using web-based technology according to preferences of the subscribers, wherein the customized information includes some or all of the information items, and wherein the customized information transmitted to the electronic device of one of the subscribers is different from the customized information transmitted to the electronic device of another of the subscribers.

2. The method according to claim 1, wherein the subscribers include one or a combination of:
a sports league to which the game belongs,
a parent of a player in the game,
a school to which a player of the game belongs;
a news organization,
a sports data agency, and
an individual who registered to receive game information.

3. The method according to claim 1, wherein, in the step of transmitting the customized information, the customized information is transmitted directly using the non-web-based technology via one or a combination of:
an email message,
a text message,
a social media message,
a file transfer to an external storage unit.

4. The method according to claim 1,
wherein, in the step of transmitting the customized information, the electronic device communicates with a push server programmed to use push technology to push the customized information to any combination of:
an email address,
a telephone number, and
a web-based application, and
wherein the non-web-based technology is used for the email address and the telephone number, and the web-based technology is used for the web-based application.

5. The method according to claim 1,
wherein the customized information includes information relating to a particular player of the game, and
wherein, in the step of transmitting the customized information, the customized information is transmitted to a subscriber who registered to receive game information relating to the particular player.

6. The method according to claim 1,
wherein the step of storing includes storing the information items relating to the game in a datafile for the game, and
wherein the step of transmitting the customized information includes transmitting the datafile to at least one of the subscribers identified on the subscriber list.

7. The method according to claim 6,
wherein the datafile includes a complete set of information items relating to the game, and
wherein the datafile includes a certification by at least one of:
the scorekeeper,
a referee for the game, and
a coach or a manager of each team of the game.

8. The method according to claim 1, wherein the information items include an indication that an event has occurred during the game, the event including at least one of:
a player scoring one or more points,
a player assisting in scoring one or more points,
a player performing a predetermined play,
an injury to player,
a player substitution,
a foul or a penalty called on a player or a team,
a time-out called by a team,
a weather-related delay,
an official end of the game,
a scoring change,
a change in team having a leading score,
a tie score, and
an overtime extension of the game.

9. The method according to claim 8, wherein the information items include at least one of:
an official time corresponding to when the event occurred,
a time period of the game when the event occurred, and
a current score of the game when the event occurred.

10. The method according to claim 1, wherein the customized information is determined based on preference information stored in the database for each subscriber on the subscriber list, the preference information indicating types of information to be transmitted or types of information not to be transmitted to the subscriber.

11. The method according to claim 10, wherein the preference information for each of the subscribers is designated by the subscriber when the subscriber registers to receive game-related information.

12. The method according to claim 11, wherein the preference information for each of the subscribers includes at least one of:
an email address of the subscriber,
a telephone number of the subscriber,
a social-media account name of the subscriber, and
a web address of the subscriber.

13. The method according to claim 1, wherein a subscriber is added to the subscriber list by completing a registration process to register to receive game-related information.

14. The method according to claim 13, wherein the registration process is completed electronically using an Internet-accessible web page.

15. The method according to claim 1, further comprising steps of:
receiving, at the electronic device, updated subscriber information, and
updating the subscriber list stored in the database based on the updated subscriber information.

16. The method according to claim 1, further comprising steps of:
calculating game statistics based a plurality of the information items relating to the game that are stored in the memory, and
storing the game statistics in the memory.

17. The method according to claim 16, further comprising a step of transmitting the game statistics to at least one subscriber identified on the subscriber list.

18. The method according to claim 1, wherein, in the step of transmitting the at least one of the information items from the electronic device to the scoreboard, a wireless communication protocol is utilized.

19. The method according to claim 18, wherein the communication protocol is one of:
a Zigbee® communication protocol,
a spread spectrum communication protocol, and
a Bluetooth® communication protocol.

20. The method according to claim 1, wherein the electronic device is one of:
a desktop computer,
a laptop computer,
a tablet computer, and
a smartphone.

21. A non-transient computer-readable storage medium storing computer code that, when executed by a computer processor, implements a method for communicating game-related information, wherein the computer code includes code for:
   providing a user interface to enable a scorekeeper to input, to an electronic device, information items relating to a game, the user interface being provided on a display screen of the electronic device;
   controlling a transmitter of the electronic device to transmit at least some of the information items to a scoreboard;
   controlling a memory of the electronic device to store the information items therein; and
   controlling a communication interface of the electronic device to transmit customized information to electronic devices of subscribers identified on a subscriber list stored in a database of the memory, the customized information being transmitted directly using non-web-based technology and indirectly using web-based technology according to preferences of the subscribers,
   wherein the customized information includes some or all of the information items, and
   wherein the customized information transmitted to the electronic device of one of the subscribers is different from the customized information transmitted to the electronic device of another of the subscribers.

22. The computer-readable storage medium according to claim 21, wherein the subscribers include one or a combination of:
   a sports league to which the game belongs,
   a parent of a player in the game,
   a school to which a player of the game belongs;
   a news organization,
   a sports data agency, and
   an individual who registered to receive game information.

23. The computer-readable storage medium according to claim 21, wherein the code for controlling the communication interface causes the customized information to be transmitted directly using the non-web-based technology via one or a combination of:
   an email message,
   a text message,
   a social media message,
   a file transfer to an external storage unit.

24. The computer-readable storage medium according to claim 21,
   wherein the code for controlling the communication interface causes the electronic device to communicate with a push server, the push server being programmed to use push technology to push the customized information to any combination of:
   an email address,
   a telephone number, and
   a web-based application, and
   wherein the non-web-based technology is used for the email address and the telephone number, and the web-based technology is used for the web-based application.

25. The computer-readable storage medium according to claim 21, wherein the customized information includes information relating to a particular player of the game, and the code for controlling the communication interface causes the customized information to be transmitted to a subscriber who registered to receive game information relating to the particular player.

26. The computer-readable storage medium according to claim 21,
   wherein the code for controlling the memory causes the memory to store the information items relating to the game in a datafile for the game, and
   wherein the code for controlling the communication interface causes the datafile to be transmitted to at least one of the subscribers identified on the subscriber list.

27. The computer-readable storage medium according to claim 26,
   wherein the datafile includes a complete set of information items relating to the game, and
   wherein the datafile includes a certification by at least one of:
   the scorekeeper,
   a referee for the game, and
   a coach or a manager of each team of the game.

28. The computer-readable storage medium according to claim 21, wherein the information items include an indication that an event has occurred during the game, the event including at least one of:
   a player scoring one or more points,
   a player assisting in scoring one or more points,
   a player performing a predetermined play,
   an injury to player,
   a player substitution,
   a foul or a penalty called on a player or a team,
   a time-out called by a team,
   a weather-related delay,
   an official end of the game,
   a scoring change,
   a change in team having a leading score,
   a tie score, and
   an overtime extension of the game.

29. The computer-readable storage medium according to claim 28, wherein the information items include at least one of:
   an official time corresponding to when the event occurred,
   a time period of the game when the event occurred, and
   a current score of the game when the event occurred.

30. The computer-readable storage medium according to claim 21,
   wherein the computer code further includes code for determining the customized information based on preference information stored in the database for each subscriber on the subscriber list, the preference information indicating types of information to be transmitted or types of information not to be transmitted to the subscriber.

31. The computer-readable storage medium according to claim 30, wherein the preference information for each of the subscribers is designated by the subscriber when the subscriber registers to receive game-related information.

32. The computer-readable storage medium according to claim 31, wherein the preference information for each of the subscribers includes at least one of:
   an email address of the subscriber,
   a telephone number of the subscriber,
   a social-media account name of the subscriber, and
   a web address of the subscriber.

33. The computer-readable storage medium according to claim 21, wherein a subscriber is added to the subscriber list by completing a registration process to register to receive game-related information.

34. The computer-readable storage medium according to claim 33, wherein the registration process is completed electronically using an Internet-accessible web page.

35. The computer-readable storage medium according to claim 21, wherein the computer code further includes code for:
  controlling the communication interface to receive updated subscriber information, and
  controlling the memory to update the subscriber list stored in the database based on the updated subscriber information.

36. The computer-readable storage medium according to claim 21, wherein the computer code further includes code for:
  calculating game statistics based a plurality of the information items relating to the game that are stored in the memory, and
  controlling the memory to store the game statistics.

37. The computer-readable storage medium according to claim 36, wherein the computer code further includes code for controlling the communication interface to transmit the game statistics to at least one subscriber identified on the subscriber list.

38. The computer-readable storage medium according to claim 21, wherein the code for controlling the transmitter of the electronic device causes the transmitter to transmit the at least one of the information items from the electronic device to the scoreboard via a wireless communication protocol.

39. The computer-readable storage medium according to claim 38, wherein the communication protocol is one of:
  a Zigbee® communication protocol,
  a spread spectrum communication protocol, and
  a Bluetooth® communication protocol.

40. The computer-readable storage medium according to claim 21, wherein the electronic device is one of:
  a desktop computer,
  a laptop computer,
  a tablet computer, and
  a smartphone.

41. An electronic apparatus for providing game-related information, the electronic apparatus comprising:
  a computer processor;
  a memory device accessible by the computer processor and storing:
    computer code executable by the computer processor, and
    data used by the computer code;
  a display screen;
  a transmitter for communicating information to a scoreboard; and
  a communication interface for communicating customized information to subscribers identified on a subscriber list stored in a database of the memory device,
  wherein the computer code includes code for:
    providing a user interface to enable a scorekeeper to input information items relating to a game, the user interface being provided on the display screen,
    controlling the transmitter to transmit at least one of the information items to the scoreboard,
    controlling the memory device to store the information items in a memory therein, and
    controlling the communication interface to transmit the customized information to electronic devices of subscribers identified on the subscriber list, the customized information being transmitted directly using non-web-based technology and indirectly using web-based technology according to preferences of the subscribers,
  wherein the customized information includes some or all of the information items, and
  wherein the customized information transmitted to the electronic device of one of the subscribers is different from the customized information transmitted to the electronic device of another of the subscribers.

42. The electronic apparatus according to claim 41, wherein the subscribers include one or a combination of:
  a sports league to which the game belongs,
  a parent of a player in the game,
  a school to which a player of the game belongs;
  a news organization,
  a sports data agency, and
  an individual who registered to receive game information.

43. The electronic apparatus according to claim 41, wherein the code for controlling the communication interface causes the customized information to be transmitted directly using the non-web-based technology via one or a combination of:
  an email message,
  a text message,
  a social media message,
  a file transfer to an external storage unit.

44. The electronic apparatus according to claim 41, wherein the code for controlling the communication interface causes the electronic apparatus to communicate with a push server, the push server being programmed to use push technology to push the customized information to any combination of:
  an email address,
  a telephone number, and
  a web-based application, and
  wherein the non-web-based technology is used for the email address and the telephone number, and the web-based technology is used for the web-based application.

45. The electronic apparatus according to claim 41, wherein the customized information includes information relating to a particular player of the game, and the code for controlling the communication interface causes the customized information to be transmitted to a subscriber who registered to receive game information relating to the particular player.

46. The electronic apparatus according to claim 41,
  wherein the memory stores the information items relating to the game in a datafile for the game, and
  wherein the code for controlling the communication interface causes the datafile to be transmitted to at least one of the subscribers identified on the subscriber list.

47. The electronic apparatus according to claim 46,
  wherein the datafile includes a complete set of information items relating to the game, and
  wherein the datafile includes a certification by at least one of:
    the scorekeeper,
    a referee for the game, and
    a coach or a manager of each team of the game.

48. The electronic apparatus according to claim 41, wherein the information items include an indication that an event has occurred during the game, the event including at least one of:
  a player scoring one or more points,
  a player assisting in scoring one or more points,
  a player performing a predetermined play,
  an injury to player,
  a player substitution,
  a foul or a penalty called on a player or a team,
  a time-out called by a team,
  a weather-related delay,
  an official end of the game, a scoring change, a change in team having a leading score, an overtime extension of the game.

49. The electronic apparatus according to claim 48, wherein the information items include at least one of:

an official time corresponding to when the event occurred, a time period of the game when the event occurred, and a current score of the game when the event occurred.

50. The electronic apparatus according to claim 41, wherein the computer code further includes code for determining the customized information based on preference information stored in the database for each subscriber on the subscriber list, the preference information indicating types of information to be transmitted or types of information not to be transmitted to the subscriber.

51. The electronic apparatus according to claim 50, wherein the preference information for each of the subscribers is designated by the subscriber when the subscriber registers to receive game-related information.

52. The electronic apparatus according to claim 51, wherein the preference information for each of the subscribers includes at least one of:

an email address of the subscriber, a telephone number of the subscriber, a social-media account name of the subscriber, and a web address of the subscriber.

53. The electronic apparatus according to claim 41, wherein a subscriber is added to the subscriber list by completing a registration process to register to receive game-related information.

54. The electronic apparatus according to claim 53, wherein the registration process is completed electronically using an Internet-accessible web page.

55. The electronic apparatus according to claim 41, wherein the computer code further includes code for:

controlling the communication interface to receive updated subscriber information, and controlling the memory device to update the subscriber list stored in the database based on the updated subscriber information.

56. The electronic apparatus according to claim 41, wherein the computer code further includes code for:

calculating game statistics based a plurality of the information items relating to the game that are stored in the memory, and controlling the memory device to store the game statistics.

57. The electronic apparatus according to claim 56, wherein the computer code further includes code for controlling the communication interface to transmit the game statistics to at least one subscriber identified on the subscriber list.

58. The electronic apparatus according to claim 41, wherein the transmitter transmits the at least one of the information items to the scoreboard via a wireless communication protocol.

59. The electronic apparatus according to claim 58, wherein the communication protocol is one of:

a Zigbee® communication protocol, a spread spectrum communication protocol, and a Bluetooth® communication protocol.

60. The electronic apparatus according to claim 41, wherein the electronic device is one of:

a desktop computer, a laptop computer, a tablet computer, and a smartphone.

61. The electronic apparatus according to claim 41, further comprising a communication port, wherein the transmitter is a detachable unit that attaches to and detaches from the communication port.

62. The electronic apparatus according to claim 61, wherein the communication port is a USB port.

\* \* \* \* \*